(12) United States Patent
Omi et al.

(10) Patent No.: US 7,421,394 B2
(45) Date of Patent: Sep. 2, 2008

(54) INFORMATION PROCESSING APPARATUS, INFORMATION PROCESSING METHOD AND RECORDING MEDIUM, AND PROGRAM

(75) Inventors: Hiromi Omi, Kanagawa (JP); Tsuyoshi Yagisawa, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 10/577,493

(22) PCT Filed: Oct. 26, 2004

(86) PCT No.: PCT/JP2004/016195

§ 371 (c)(1),
(2), (4) Date: Apr. 27, 2006

(87) PCT Pub. No.: WO2005/045804

PCT Pub. Date: May 19, 2005

(65) Prior Publication Data

US 2007/0043552 A1    Feb. 22, 2007

(30) Foreign Application Priority Data

Nov. 7, 2003    (JP) .............................. 2003-378877

(51) Int. Cl.
   *G10L 21/00*    (2006.01)
   *G06F 17/28*    (2006.01)
(52) U.S. Cl. ........................... 704/277; 704/9; 704/270; 704/2; 704/257
(58) Field of Classification Search ...................... 704/2, 704/9, 10, 231, 257, 260, 270, 275, 277; 710/65; 707/535, 532, 533, 530
See application file for complete search history.

(56) References Cited

U.S. PATENT DOCUMENTS

| 5,231,670 | A | * | 7/1993 | Goldhor et al. | ............. | 704/275 |
| 5,652,898 | A | * | 7/1997 | Kaji | ............................ | 704/10 |
| 5,778,344 | A | * | 7/1998 | Attwater et al. | ............. | 704/275 |
| 5,787,455 | A | * | 7/1998 | Seybold | ..................... | 711/100 |

(Continued)

FOREIGN PATENT DOCUMENTS

JP    63-48040    2/1988

(Continued)

*Primary Examiner*—Vijay B Chawan
(74) *Attorney, Agent, or Firm*—Fitzpatrick, Cella, Harper & Scinto

(57) ABSTRACT

This invention has as its object to save labor time required for correction and adjustments when an error has occurred during either the recognition of input data or the process of the recognition result of an information processing apparatus which recognizes input data and outputs the recognition result. The information processing method described in this embodiment includes a recording step of recording input data (step S708), a recognition step of recognizing the input data (step S707), a determination step of determining whether or not the input data can be recognized in the recognition step (step S709), and an output step of outputting, when it is determined in the determination step that the input data can be recognized, data generated based on a recognition result in the recognition step (step S713), and outputting, when it is determined in the determination step that the input data cannot be recognized, output data generated based on the input data which is recorded in the recording step (step S710).

19 Claims, 13 Drawing Sheets

U.S. PATENT DOCUMENTS

| | | | |
|---|---|---|---|
| 5,890,182 A | | 3/1999 | Yagisawa et al. |
| 5,963,892 A | * | 10/1999 | Tanaka et al. .................. 704/2 |
| 5,991,721 A | * | 11/1999 | Asano et al. ................ 704/257 |
| 6,167,368 A | * | 12/2000 | Wacholder ..................... 704/9 |
| 6,192,332 B1 | * | 2/2001 | Golding ......................... 704/2 |
| 6,266,642 B1 | * | 7/2001 | Franz et al. ................. 704/277 |
| 6,356,865 B1 | * | 3/2002 | Franz et al. .................... 704/2 |
| 6,779,060 B1 | * | 8/2004 | Azvine et al. ................ 710/65 |
| 2001/0042082 A1 | | 11/2001 | Ueguri et al. |
| 2003/0046076 A1 | | 3/2003 | Hirota et al. |
| 2003/0061030 A1 | | 3/2003 | Kuboyama e al. |
| 2004/0143441 A1 | | 7/2004 | Aizawa et al. |

FOREIGN PATENT DOCUMENTS

| | | |
|---|---|---|
| JP | 1-293490 | 11/1989 |
| JP | 7-121651 | 5/1995 |
| JP | 7-160289 | 6/1995 |
| JP | 2000-29492 | 1/2000 |

* cited by examiner

INFORMATION PROCESSING APPARATUS, INFORMATION PROCESSING METHOD AND RECORDING MEDIUM, AND PROGRAM

TECHNICAL FIELD

The present invention relates to a user interface in a recognition process of input data

BACKGROUND ART

In recent years, various user interfaces that use recognition techniques such as a speech recognition technique, text recognition technique, and the like have been proposed. For example, Japanese Patent Laid-Open No. 7-160289 has proposed a user interface which allows the user to easily correct recognition results, which cannot be determined by a speech recognition apparatus, in correspondence with input speech. With this user interface, the user can easily correct recognition results that cannot be recognized.

Japanese Patent Laid-Open No. 63-48040 has proposed a user interface which records input speech and plays it back for a partner user to make him or her confirm in a private branch exchange which recognizes the callee's name uttered by a caller. In this way, even when a wrong recognition result is obtained, the partner user can recognize it by hearing the playback tone. Hence, when the partner user notices a wrong recognition result, he or she can correct it by himself or herself.

However, with both the prior arts, when an error has occurred during a recognition process, or when a wrong recognition result is obtained, the user himself or herself must correct it, resulting in poor convenience. Even when a recognition result is correct, if an error has occurred upon executing a post-process (e.g., a translation process) using the recognition result, the user himself or herself must correct it.

On the other hand, it is difficult to register all words and phrases including proper nouns in a grammar and standard patterns for recognition, and improvement of the recognition rate has its limits. For this reason, when an error has occurred during a recognition process or a post-process using the recognition result, it is desired to save labor required for user's correction as much as possible.

DISCLOSURE OF INVENTION

The present invention has been made in consideration of the above situation, and has as its object to save labor required for the user's correction and improve user's convenience even when an error has occurred during recognition of input data or a post-process using the recognition result in an information processing apparatus which recognizes input data and outputs the recognition result.

In order to achieve the above object, an information processing apparatus according to the present invention comprises the following arrangement.

That is, an information processing apparatus comprises:
recording means for recording input data;
recognition means for recognizing the input data;
determination means for determining whether or not the recognition means can recognize the input data; and
output means for, when the determination means determines that the recognition means can recognize the input data, outputting data generated based on a recognition result of the recognition means, and for, when the determination means determines that the recognition means cannot recognize the input data, outputting output data generated based on the input data which is recorded in the recording means.

According to this invention, even when an error has occurred during recognition of input data or a post-process using the recognition result in an information processing apparatus which recognizes input data and outputs the recognition result, labor required for user's correction can be saved and user's convenience can be improved.

BRIEF DESCRIPTION OF DRAWINGS

Features and advantages of the present invention will be sufficiently understood from the following detailed description of the preferred embodiments taken in conjunction with the accompanying drawings.

BEST MODE FOR CARRYING OUT THE INVENTION

Embodiments of the present invention will be described hereinafter with reference to the accompanying drawings.

First Embodiment

Figure 1:
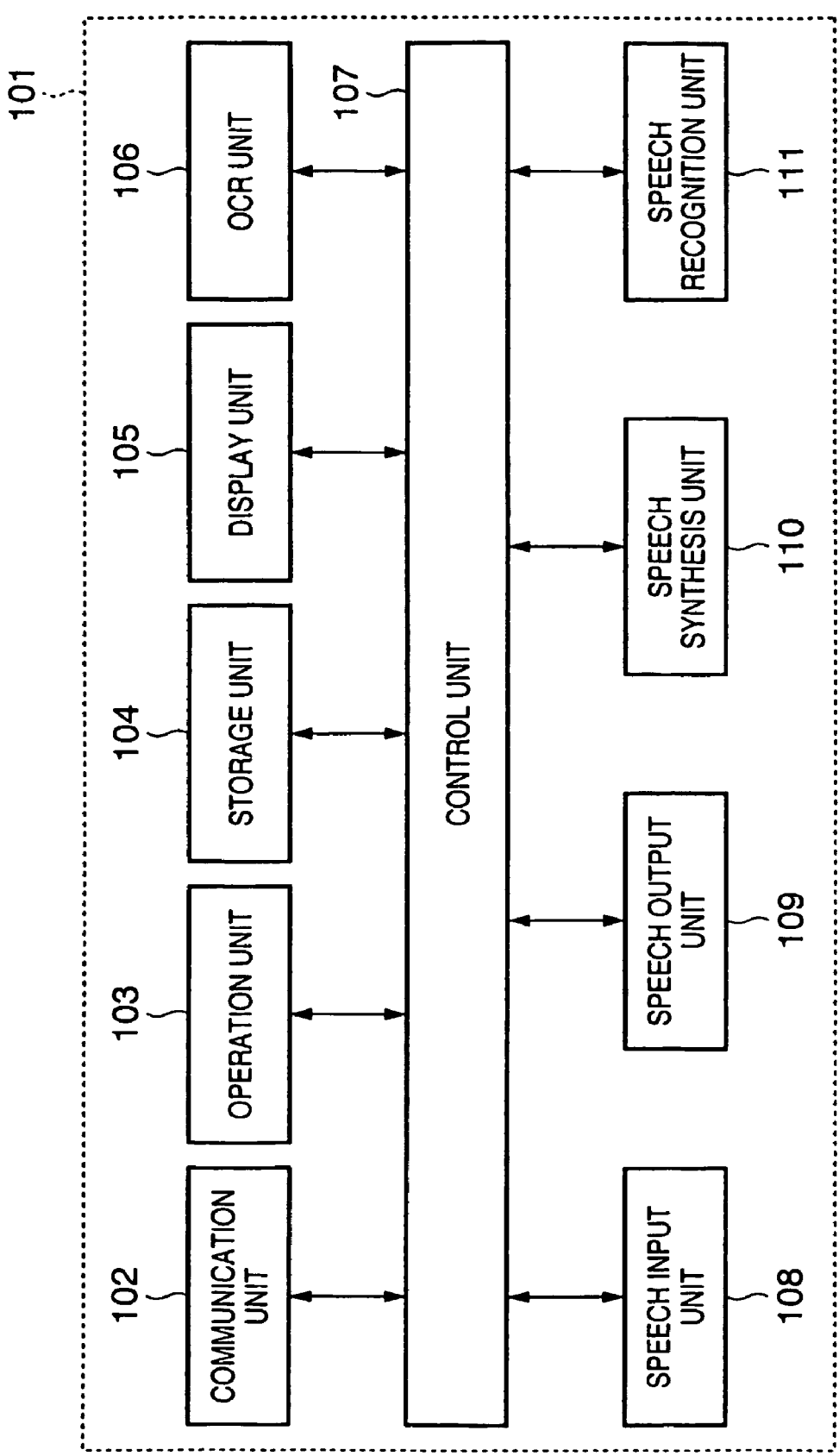
FIG. 1 is a schematic block diagram showing the arrangement of an information processing apparatus according to each embodiment of the present invention.

An embodiment of the present invention will be described hereinafter with reference to the accompanying drawings. FIG. 1 is a schematic block diagram showing the arrangement of an information processing apparatus according to an embodiment of the present invention. An information processing apparatus 101 includes a communication unit 102, operation unit 103, storage unit 104, display unit 105, OCR unit 106, control unit 107, speech input unit 108, speech output unit 109, speech synthesis unit 110, and speech recognition unit 111.

The communication unit 102 is connected to a network and makes data communications with external devices and the like. The operation unit 103 includes buttons, a keyboard, mouse, touch panel, pen, tablet, and the like, and is used to operate the apparatus. The storage unit 104 comprises a storage medium such as a magnetic disk, optical disk, hard disk device, or the like, and stores application programs, input text data, image data, speech data, and the like. The display unit 105 comprises a display device such as a liquid crystal display or the like, and displays pictures, text, and the like.

The OCR unit 106 optically reads handwritten or printed characters, specifies characters by collation with patterns which are stored in advance, and inputs text data. The OCR unit 106 may comprise a scanner, and OCR software which identifies characters from read images, and converts the characters into document data. The control unit 107 comprises a work memory, microcomputer, and the like, and reads out and executes programs stored in the storage unit 104. The speech input unit 108 includes a microphone and the like, and inputs speech uttered by the user. The speech output unit 109 comprises a loudspeaker, headphone, or the like, and outputs speech synthesized by the speech synthesis unit 110, speech stored in the storage unit 104, and the like. The speech synthesis unit 110 generates synthetic speech of text stored in the storage unit 104. The speech recognition unit 111 applies speech recognition to speech input via the speech input unit 108. As the speech recognition technique and speech synthesis technique, existing ones are used.

Figure 2:
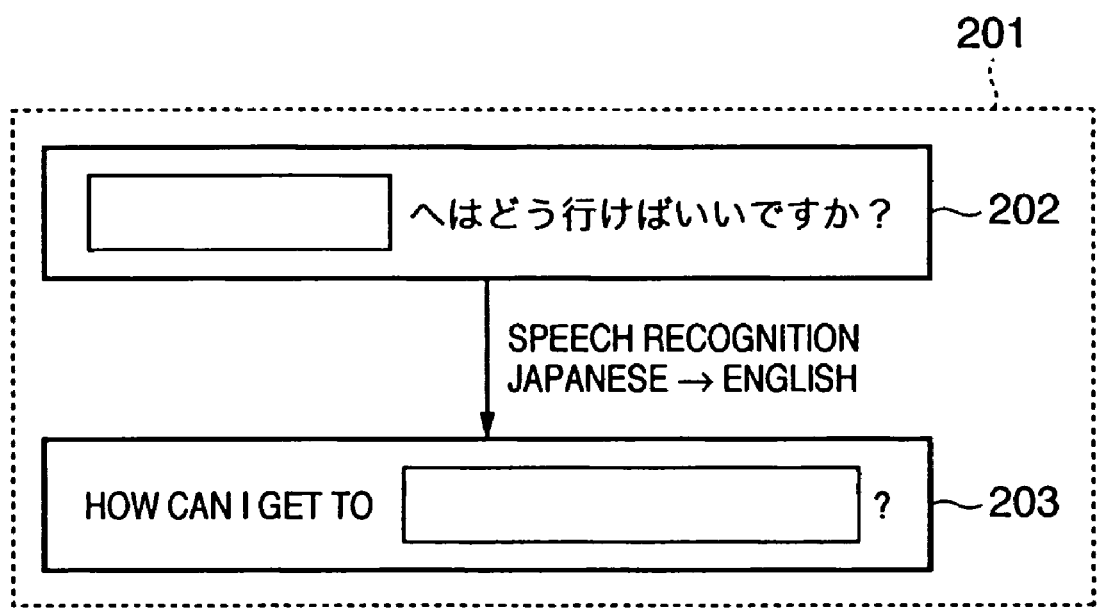
FIG. 2 shows an example of a user interface of an information processing apparatus according to the first embodiment of the present invention.

A feature of the information processing apparatus according to the first embodiment of the present invention will be described below. FIG. 2 shows an example of the user interface used when the speech recognition unit 111 recognizes speech input via the speech input unit 108, the recognition result is translated from Japanese into English, the speech synthesis unit 110 generates synthetic speech of the generated English text, and the speech output unit 109 outputs the synthetic speech. In such a case, the user often utters a proper noun, but it is difficult to register all words and phrases in a grammar for speech recognition. Likewise, in a translation process, it is difficult to register English translation of all words and phrases. Hence, in the apparatus of this embodiment, the user's input speech is recorded, and when a word or phrase which is not registered in the speech recognition grammar is input, when an error has occurred during a speech recognition process, when the speech recognition result has a low certainty factor, when no corresponding English translation is registered, when an error has occurred during a translation process, when the translation result has a low certainty factor, or the like, a speech synthesis output generated from a defined sentence, and playback of the recorded input speech are combined.

When the user recognizes beforehand that a word or phrase to be input is a word or phrase which is not registered in the recognition grammar or a word or phrase which cannot undergo, e.g., a translation process or the like, he or she can select a recording/playback mode in which input speech is recorded, and a speech synthesis output generated from a defined sentence, and playback of the recorded input speech are combined upon output. The speech recognition technique, speech synthesis technique, and translation technique use existing ones.

Various operations of the information processing apparatus according to this embodiment will be described below using examples shown in FIGS. 3 to 6.

Figure 3:
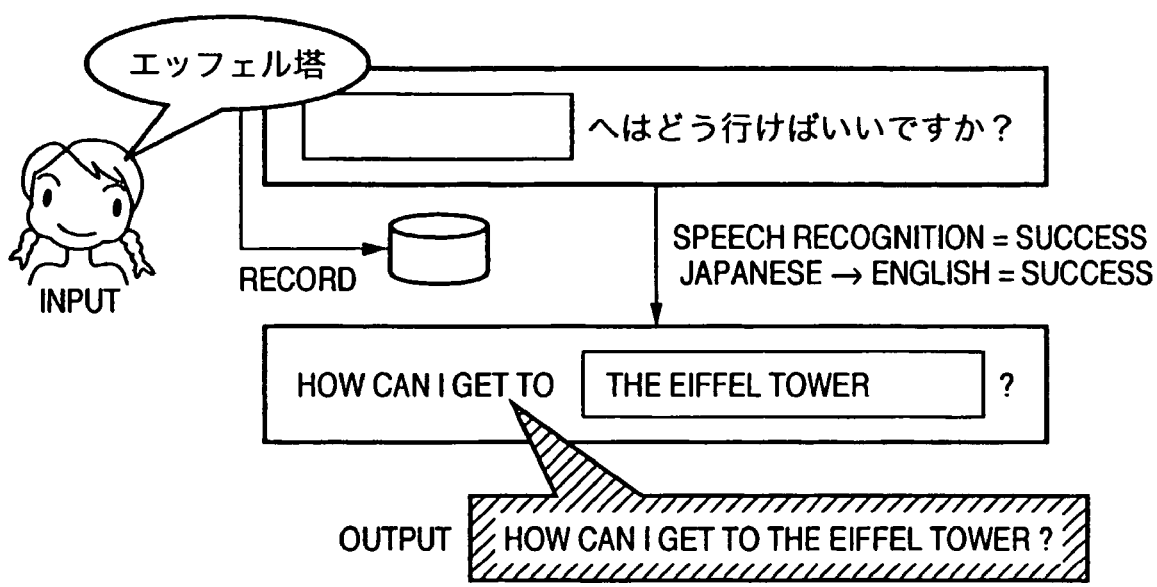
FIG. 3 is a view for explaining the operation of the information processing apparatus according to the first embodiment of the present invention.

FIG. 3 shows an example wherein the user's input speech "Efferu-to" can be successfully recognized. In this case, the speech recognition result "Efferu-to" is translated into "the Eiffel Tower" in English. As a result, a generated sentence "How can I get to the Eiffel Tower?" is output as synthetic speech. Note that the output may be displayed as a text message or an icon on the display screen in addition to synthetic speech.

Figure 4:
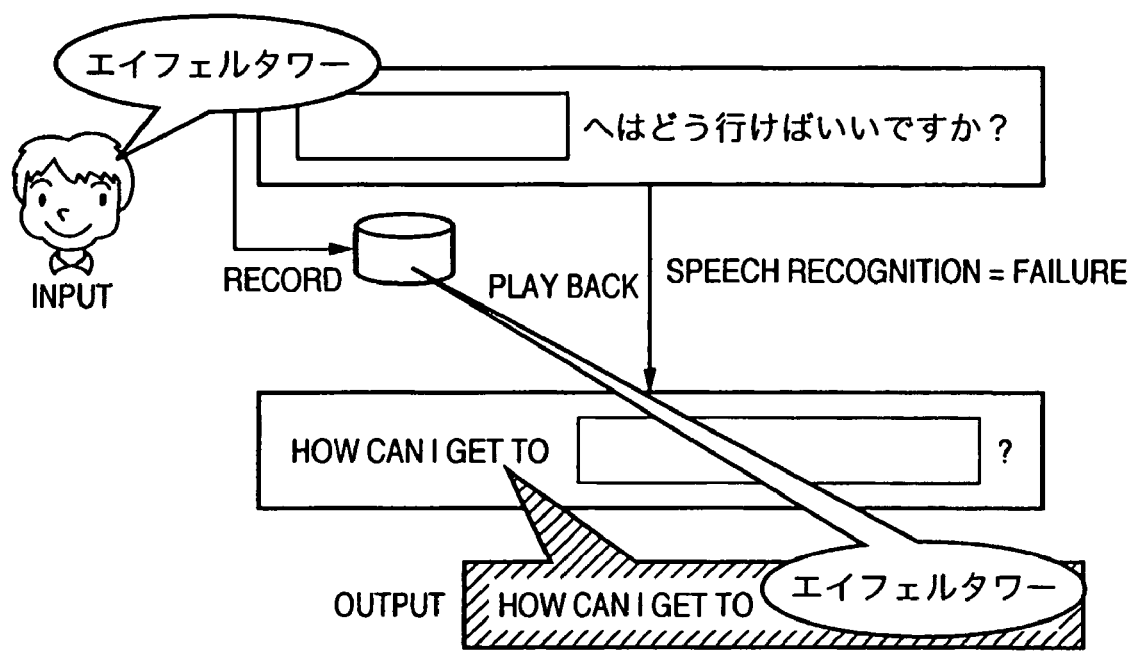
FIG. 4 is a view for explaining the operation of the information processing apparatus according to the first embodiment of the present invention.

By contrast, FIG. 4 shows an example when a word "Eiferu-tawa" input by the user is not registered in the speech recognition grammar, when an error has occurred during a recognition process, or when the recognition result has a poor certainty factor (e.g., 30% or less). In this case, a speech synthesis output generated from a defined sentence and playback of the recorded input speech are combined. In the example of FIG. 4, a defined sentence "How can I get to" is output as synthetic speech, and the user's input speech "Eiferu-tawa" is played back after that speech. At this time, a text message or icon which indicates that the word is not registered in the speech recognition grammar, an error has occurred during the recognition process, or the recognition result has a low certainty factor, or the like may be displayed.

Figure 5:
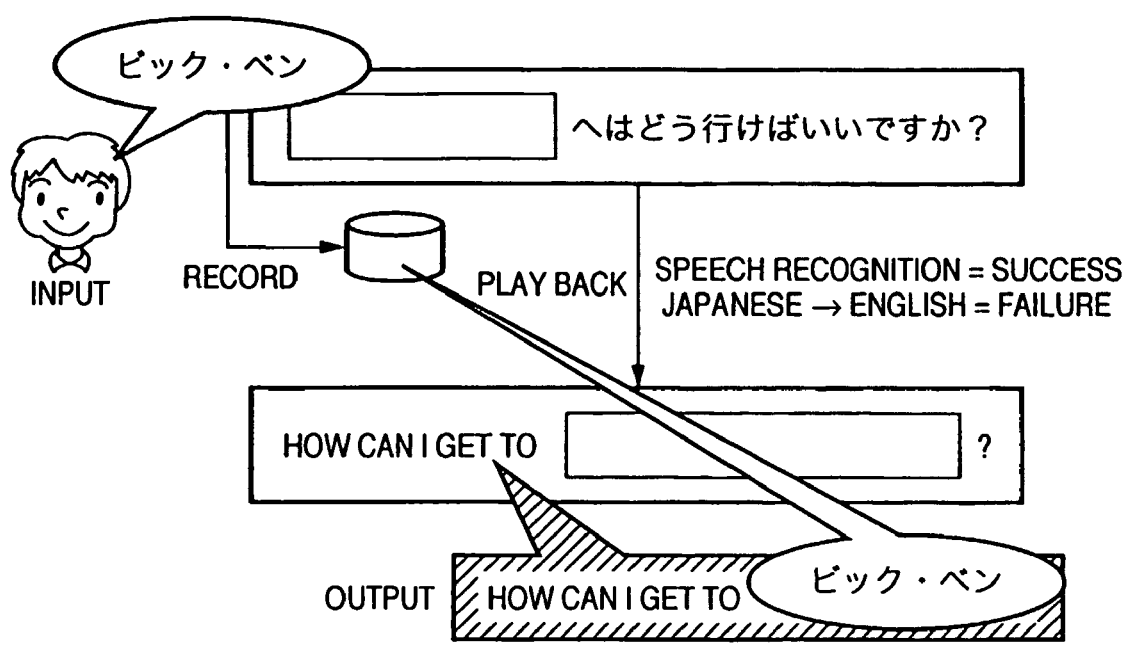
FIG. 5 is a view for explaining the operation of the information processing apparatus according to the first embodiment of the present invention.

FIG. 5 shows an example when no corresponding English translation is registered, when an error has occurred, or when the processing result has a low certainty factor during the application process (translation process). The user's input speech "Biggu-Ben" is recognized, and the word "Biggu-Ben" as the speech recognition result is translated from Japanese into English. When no English translation of the recognition result "Biggu-Ben" is registered in the system in the translation process, when an error has occurred during the translation process, or when the translation result has a low certainty factor (e.g., 30% or less), a speech synthesis output generated from a defined sentence and playback of the recorded input speech are combined.

In the example of FIG. 5, a defined sentence "How can I get to" is output as synthetic speech, and the recorded user's input speech "Biggu-Ben" is played back after that output. At this time, a text message or icon indicating no corresponding English translation is available, an error has occurred during the translation process, the translation result has a low certainty factor, or the like may be displayed on the display screen. When no English translation of the recognition result "Biggu-Ben" is registered in the translation process, text "Biggu-Ben" as the recognition result may be output, and "How can I get to Biggu-Ben" may be output as synthetic speech.

Figure 6:
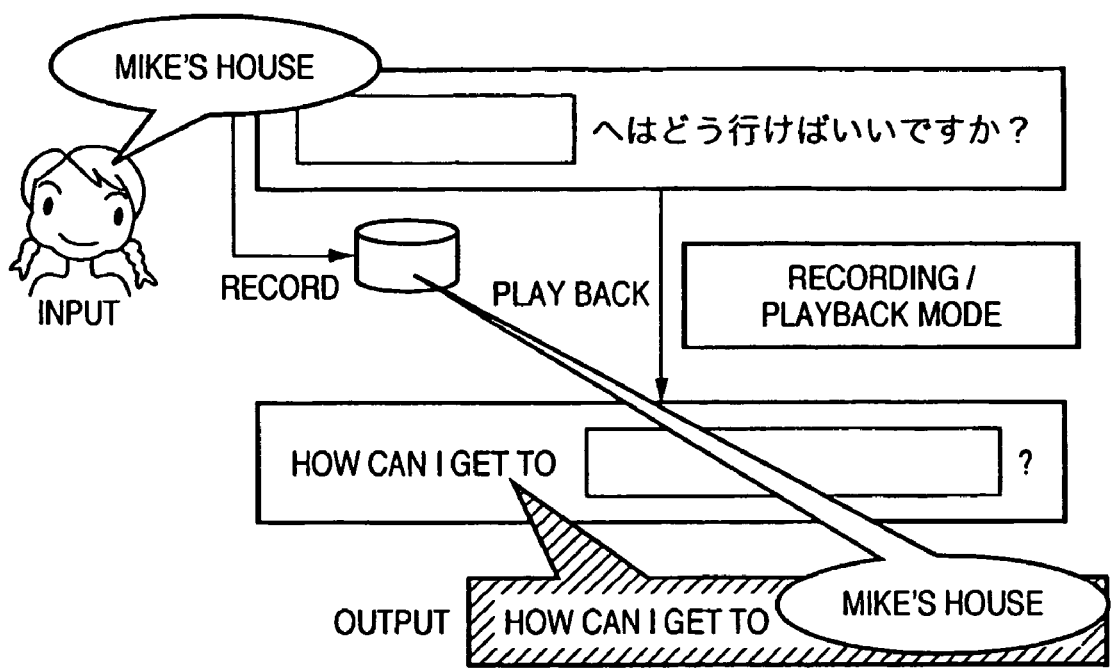
FIG. 6 is a view for explaining the operation of the information processing apparatus according to the first embodiment of the present invention.

When the user recognizes beforehand that a word or phrase to be input is a word or phrase which is not registered in the recognition grammar or a word or phrase which cannot undergo, e.g., a translation process or the like, he or she can select a recording/playback mode in which input speech is recorded, and a speech synthesis output generated from a defined sentence, and playback of the recorded input speech are combined upon output. As shown in FIG. 6, in the recording/playback mode, the user's input speech "Mike's house" is recorded, and the speech recognition and translation processes are skipped. Upon output, a defined sentence "How can I get to" is output as synthetic speech, and the recorded user's input speech "Mike's house" is played back. At this time, a text message or icon which indicates that the recorded input speech is played back may be displayed on the display screen.

Figure 7:
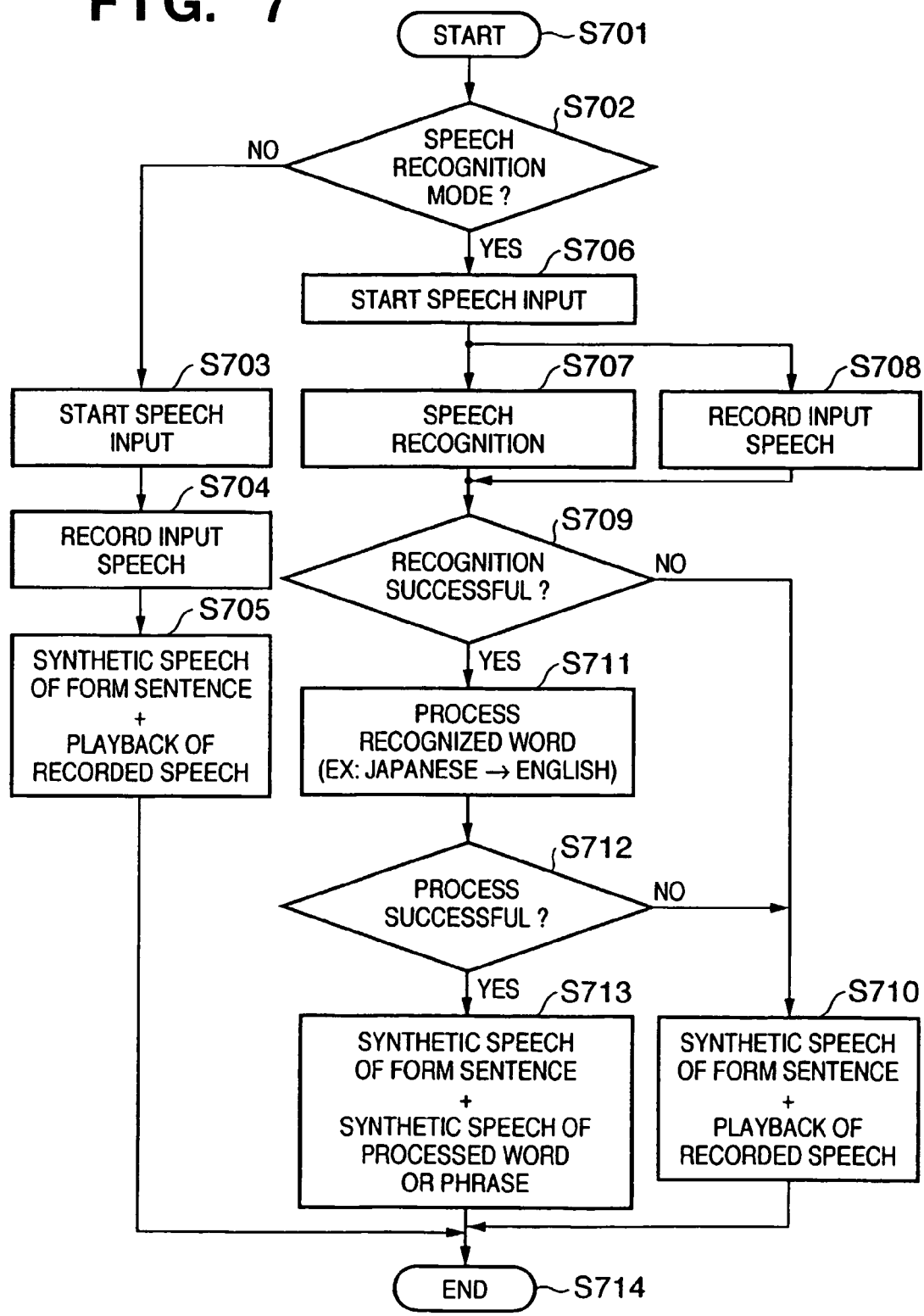
FIG. 7 is a flowchart showing the operation of the information processing apparatus according to the first embodiment of the present invention.

The aforementioned operations will be described below using the flowchart shown in FIG. 7. Initially, a setup indicating whether or not the speech recognition mode is selected is loaded (step S702). If the speech recognition mode is not selected (the recording/playback mode is selected), and speech is input (step S703), the speech is recorded (step S704). Upon output, a speech synthesis output generated from a defined sentence, and playback of the recorded input speech are combined (step S705, FIG. 6).

On the other hand, if the speech recognition mode is selected and speech is input, the input speech is recognized (step S707), and is recorded (step S708). If the user's input word or phrase is not registered in the speech recognition grammar, if an error has occurred during the recognition process, or if the recognition result has a low certainty factor (e.g., 30% or less) (i.e., if "NO" in step S709), a speech synthesis output generated from a defined sentence, and playback of the recorded input speech are combined (step S710, FIG. 4). If the user's input word or phrase is registered in the speech recognition grammar, or if the recognition result has a high certainty factor (e.g., 30% or higher) (i.e., if "YES" in step S709), the recognized word or phrase is processed (translation process) (step S711).

In the translation process, if no corresponding English translation of the recognition result is registered, if an error has occurred during the translation process of the recognition result, or if the translation result has a low certainty factor (e.g., 30% or less) (i.e., if "NO" in step S712), a speech synthesis output generated from a defined sentence, and playback of the recorded input speech are combined (step S710, FIG. 5). If the corresponding English translation of the recognition result is registered in the system, or if the translation result has a high certainty factor (e.g., 30% or higher) (i.e., if "YES" in step S712), the full generated sentence is output as synthetic speech (step S713, FIG. 3). The output may be displayed as a text message or icon on the display screen in addition to synthetic speech.

As described above, according to this embodiment, input speech is recorded, and when a word or phrase which is not registered in the speech recognition grammar is input, when an error has occurred during speech recognition, when the recognition result has a low certainty factor, when no corresponding English translation is registered in the system, when an error has occurred during the translation process, or when the processing result has a low certainty factor, a speech synthesis output generated from a defined sentence, and playback of the recorded input speech are output in combination, thus reducing the number of times of user's manual correction upon occurrence of a recognition error or any other errors, and improving the convenience.

Second Embodiment

An information processing apparatus according to the second embodiment of the present invention will be described below. The first embodiment has exemplified a case wherein speech is recognized. This embodiment will exemplify a case wherein handwritten characters are recognized. Note that the apparatus arrangement is the same as that shown in FIG. 1, and a description thereof will be omitted. An existing technique is used to recognize handwritten characters. Note that characters are not limited to handwritten characters, and characters which are specified by optically scanning printed characters by the OCR unit 106 and collating them with pre-stored patterns may be used.

Figure 8:
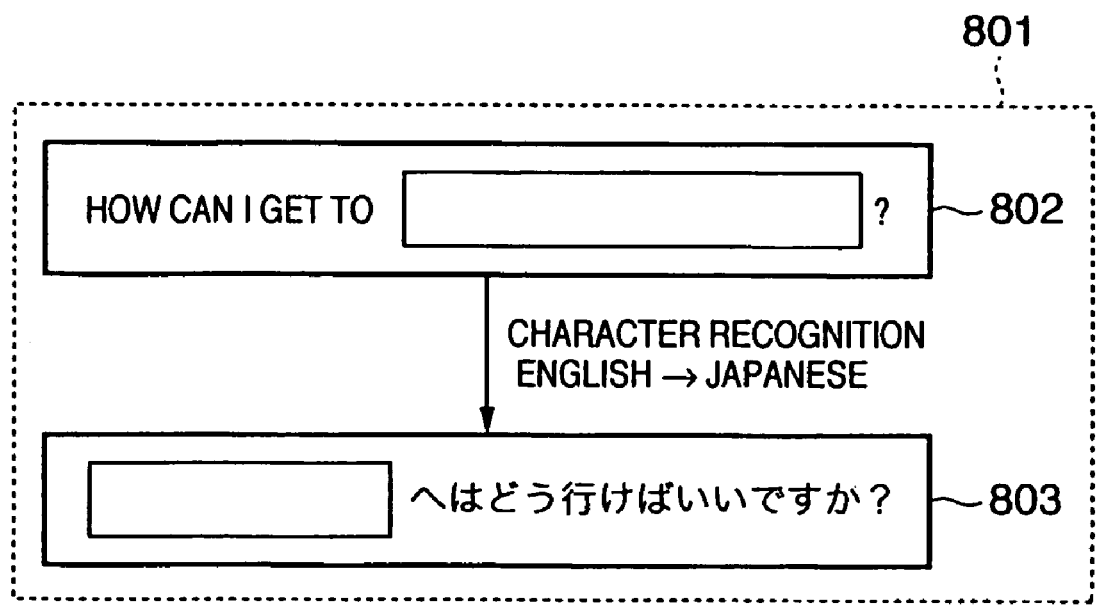
FIG. 8 shows an example of a user interface of an information processing apparatus according to the second embodiment of the present invention.

FIG. 8 shows the operation of the apparatus when the control unit 107 recognizes characters input via the operation unit 103, the recognized characters are translated from English into Japanese, and a generated Japanese sentence is displayed as text on the display unit 105. As in the first embodiment, the user's input character image is recorded in the storage unit 104, and when characters which are not registered in standard patterns for character recognition are input, when an error has occurred during character recognition, when the character recognition result has a low certainty factor, when no corresponding Japanese translation is registered, when an error has occurred during the translation process, or when the translation result has a low certainty factor, a text output of a defined sentence and an output of the recorded input character image are combined.

When the user recognizes beforehand that characters (word or phrase) to be input are not registered in the standard patterns for recognition, or cannot undergo a translation process or the like, he or she can select a recording/output mode in which an input character image is recorded, and a text output of a defined sentence and an output of the recorded input character image are combined upon output. The text output technique and translation technique use existing ones.

Various operations of the information processing apparatus according to this embodiment will be described below using examples shown in FIGS. 9 to 12.

Figure 9:
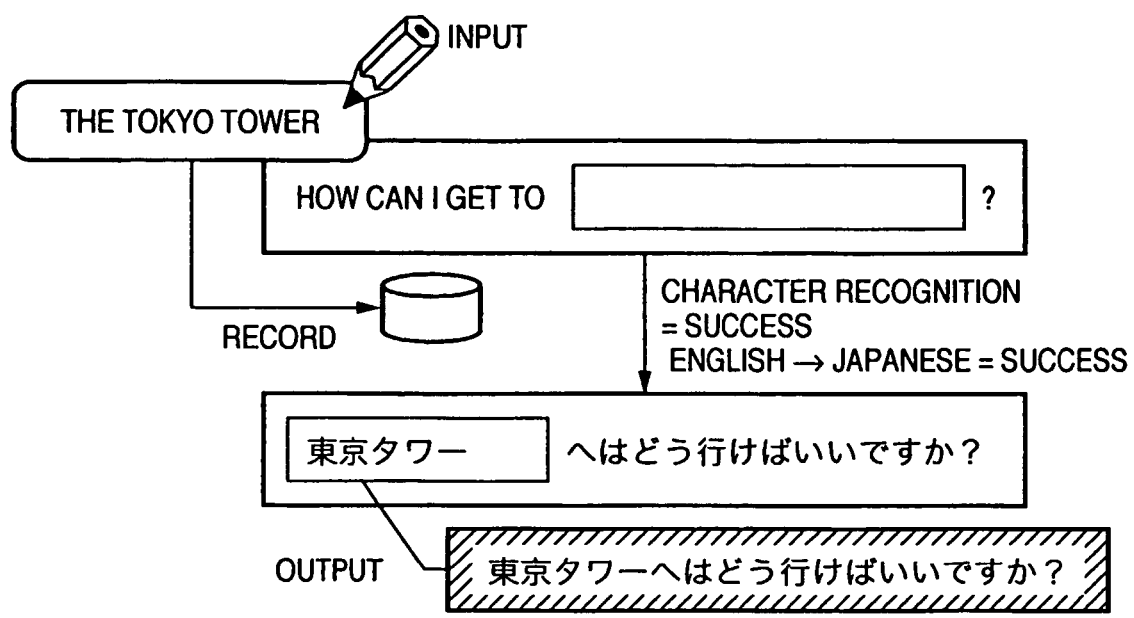
FIG. 9 is a view for explaining the operation of the information processing apparatus according to the second embodiment of the present invention.

FIG. 9 shows an example wherein the user's input characters "the Tokyo Tower" can be successfully recognized. In this case, the character recognition result "the Tokyo Tower" is translated into "東京タワー" in Japanese. As a result, a generated sentence "東京タワーはどう行けばいいですか?" is output as text. Note that the output may be made using synthetic speech of the text in addition to the text output.

Figure 10:
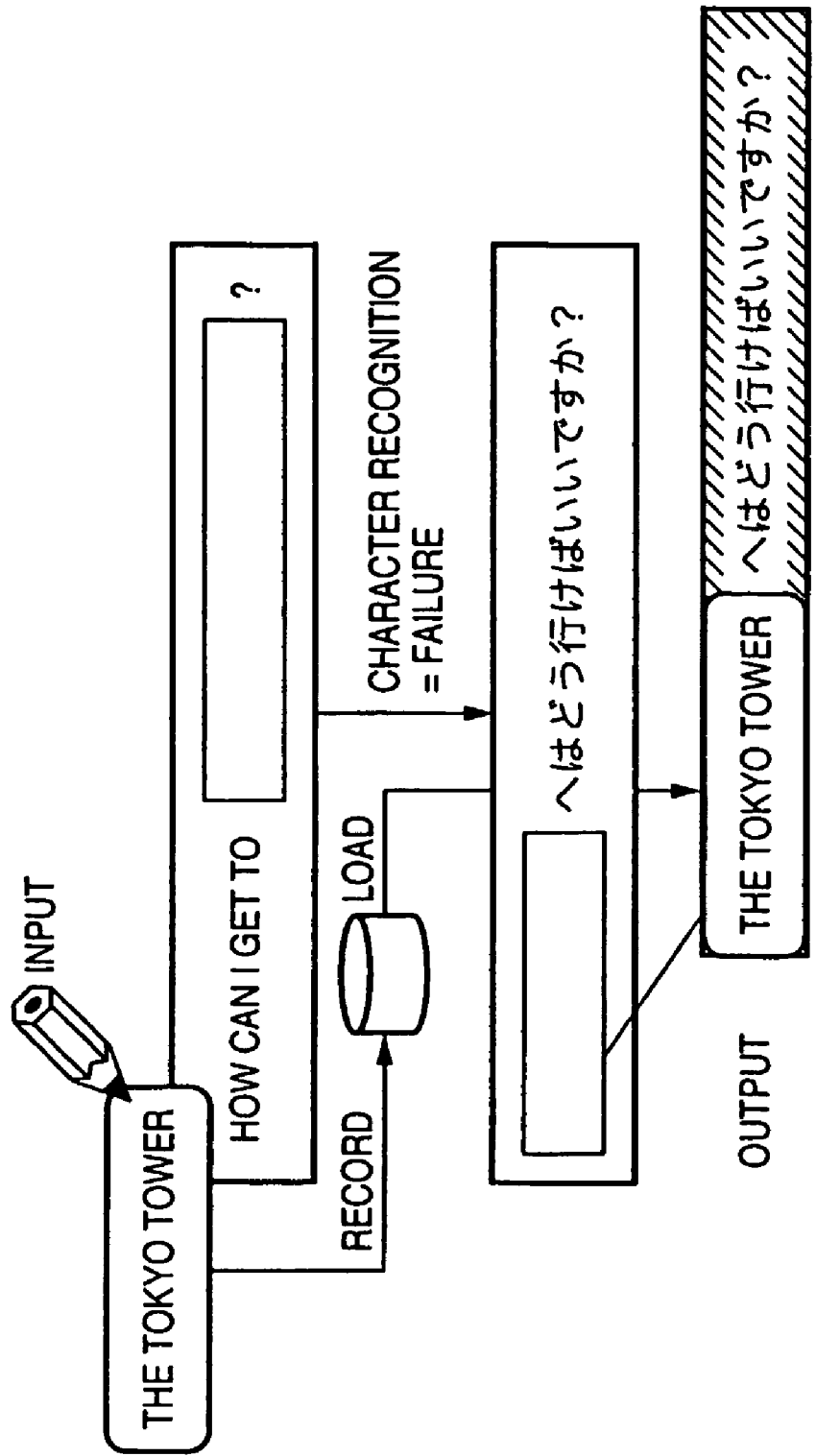
FIG. 10 is a view for explaining the operation of the information processing apparatus according to the second embodiment of the present invention.

By contrast, FIG. 10 shows an example when the user's input characters are not registered in standard patterns for character recognition, when an error has occurred during character recognition, or when the recognition result has a low certainty factor (e.g., 30% or less). In this case, a text output of a defined sentence and an output of the recorded input character image are combined. In the example of FIG. 10, the user's input character image "the Tokyo Tower" is output, and a defined sentence "へはどう行けばいいですか?" is output as text. At this time, a text message, icon, or voice message indicating that the user's input characters are not registered in standard patterns for character recognition, an error has occurred during character recognition, or the recognition result has a low certainty factor, may be output.

Figure 11:
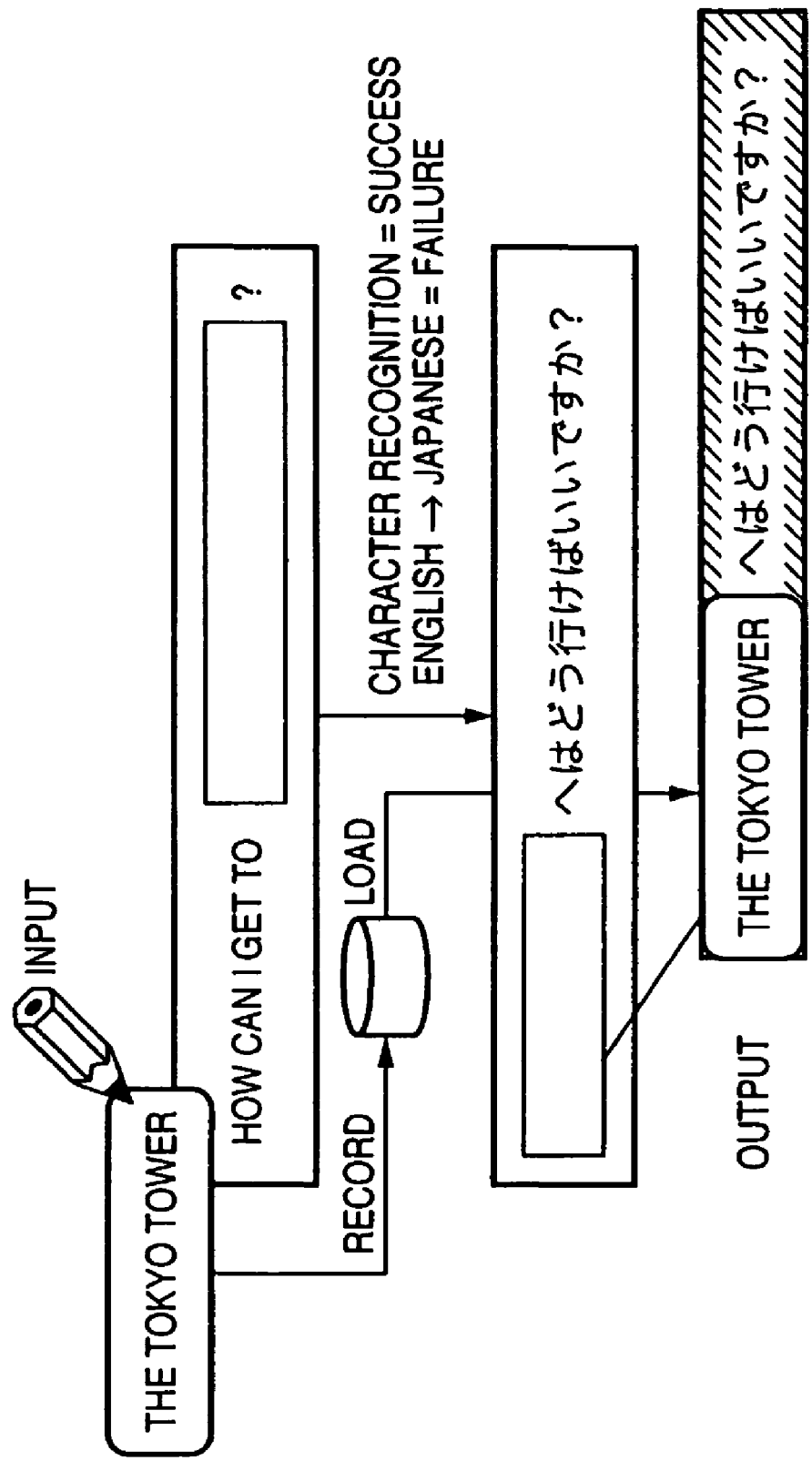
FIG. 11 is a view for explaining the operation of the information processing apparatus according to the second embodiment of the present invention.

FIG. 11 shows an example when no corresponding Japanese translation is registered in the system, when an error has occurred during an application process (translation process), or when the processing result has a low certainty factor. The user's input characters "the Tokyo Towr" are recognized, and the character recognition result "the Tokyo Towr" is translated from English into Japanese. In the translation process, when no corresponding Japanese translation of the recognition result "the Tokyo Towr" is registered in the system, when an error has occurred during the translation process, or when the translation result has a low certainty factor (e.g., 30% or less), a text output of a defined sentence and an output of the recorded input character image are combined.

In the example of FIG. 11, the user's input character image "the Tokyo Towr" is output, and a defined sentence "へはどう行け?" is output as text. At this time, a text message, icon, or voice message indicating that no corresponding Japanese translation is registered, an error has occurred during the translation process, or the translation result has a low certainty factor may be output. In the translation process, when no corresponding Japanese translation of the recognition result "the Tokyo Towr" is registered in the system, text "the Tokyo Towr" as the recognition result may be output, and "the Tokyo Towr へはどう行け?" may be output as text.

Figure 12:
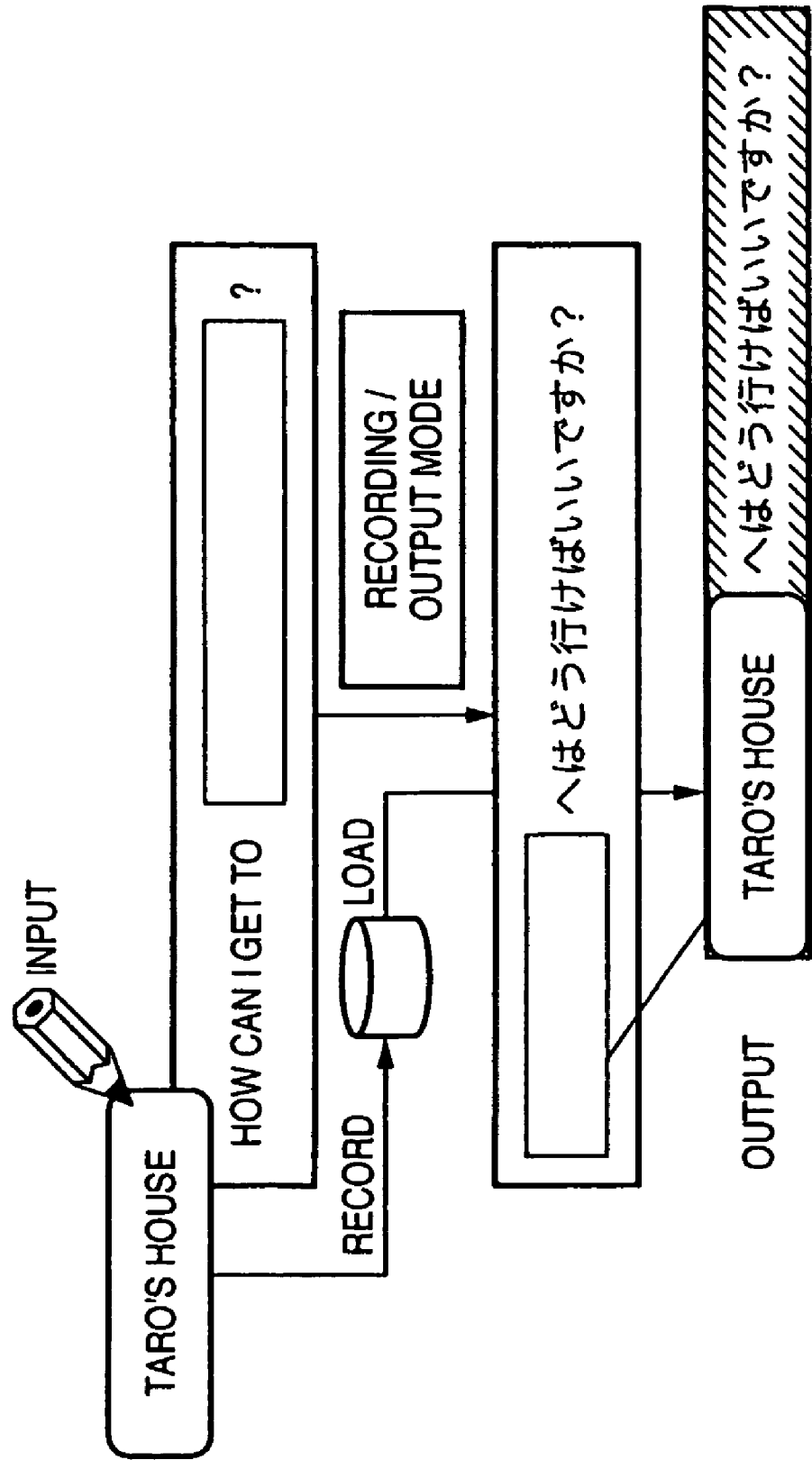
FIG. 12 is a view for explaining the operation of the information processing apparatus according to the second embodiment of the present invention.

When the user recognizes before hand that characters to be input are a word or phrase which is not registered in the standard patterns for recognition, or no corresponding Japanese translation is registered, he or she can select a recording/output mode in which an input character image is recorded, and a text output of a defined sentence and an output of the recorded input character image are combined upon output. As shown in FIG. 12, in the recording/output mode, the user's input character image "Taro's house" is recorded, and the character recognition and translation processes are skipped. Upon output, the user's input character image "Taro's house" is output, and a defined sentence "へはどう行け?" is output as text. At this time, a text message, icon, or voice message indicating that the recorded input character image is output may be output.

Figure 13:
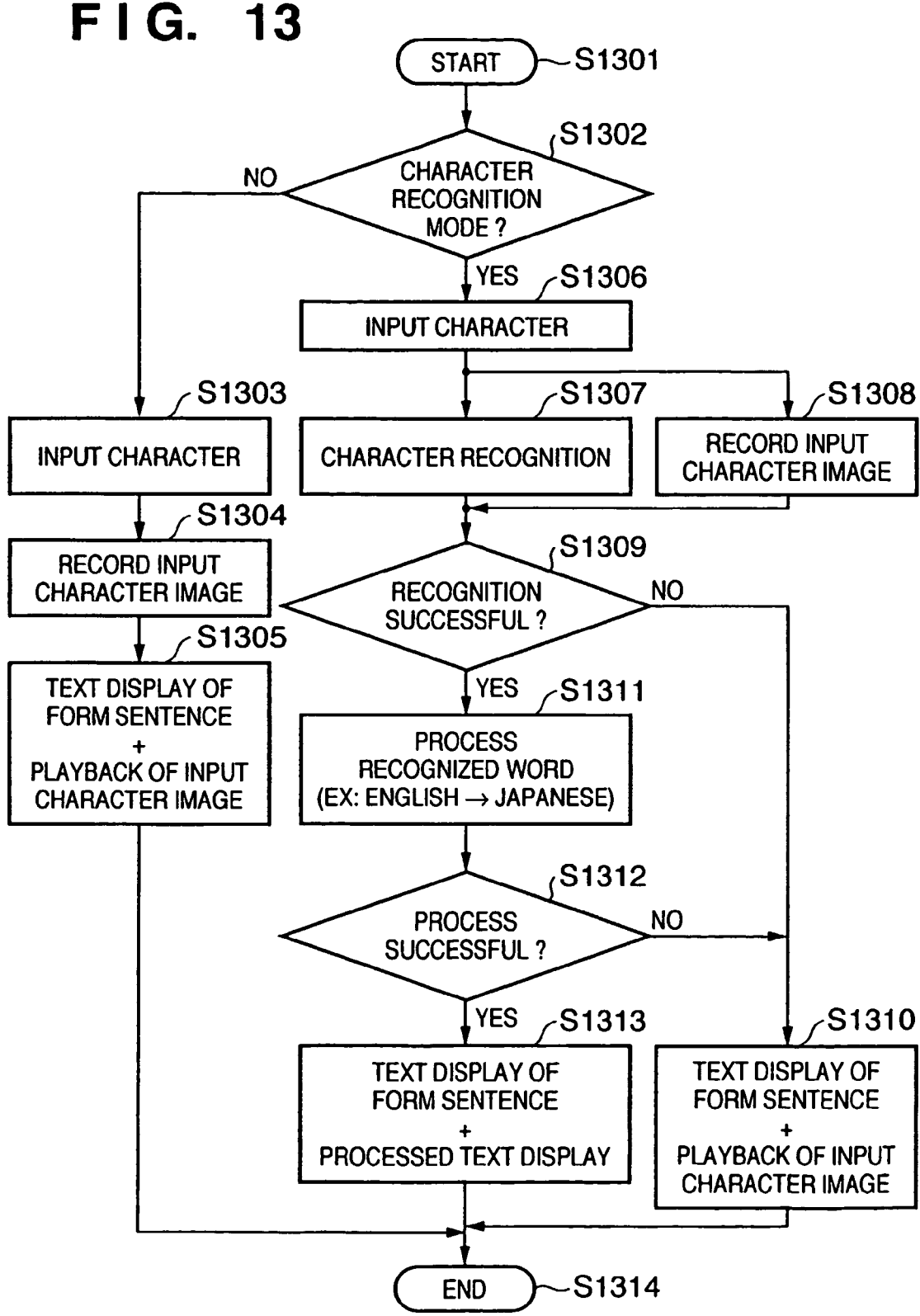
FIG. 13 is a flowchart showing the operation of the information processing apparatus according to the second embodiment of the present invention.

The aforementioned operations will be explained below using the flowchart of FIG. 13. Initially, a setup indicating whether or not the character recognition mode is selected is loaded (step S1301). If the character recognition mode is not selected (if the recording/output mode is selected) and characters are input (step S1303), the character image is recorded (step S1304). Upon output, a text output of a defined sentence and an output of the recorded input character image are combined (step S1305, FIG. 12).

On the other hand, if the character recognition mode is selected and characters are input (step S1306), the input characters are recognized (step S1307), and the input character image is recorded (step S1308). If the user's input characters are not registered in the standard patterns for character recognition, if an error has occurred during the recognition process, or if the recognition result has a low certainty factor (e.g., 30% or less) (i.e., if "NO" in step S1309), a text output of a defined sentence and an output of the recorded input character image are combined (step S1310, FIG. 10). If the user's input characters are registered in the standard patterns for character recognition, or if the recognition result has a high certainty factor (e.g., 30% or higher) (i.e., if "YES" in step S1309), the recognized word or phrase is processed (translation process) (step S1311). In the translation process, if no Japanese word or phrase corresponding to the recognition result is registered in the system, if an error has occurred during the translation process, or if the translation result has a low certainty factor (e.g., 30% or less) (i.e., if "NO" in step S1312), a text output of a defined sentence and an output of the recorded input character image are combined (step S1310, FIG. 11). if the Japanese word or phrase corresponding to the recognition result is registered in the system, or if the translation result has a high certainty factor (e.g., 30% or higher) (i.e., if "YES" in step S1312), the full generated sentence is output as text (step S1313, FIG. 9). The output may be made by synthetic speech of text in addition to the text output.

Note that the character recognition may use image recognition that exploits an existing image recognition technique, and text according to the user's input image may be output after translation or the recorded input image may be output.

As described above, according to the second embodiment, an input character image is recorded, and when characters unregistered in the standard patterns for character recognition, when an error has occurred during character recognition, when the recognition result has a low certainty factor, when no corresponding Japanese translation is registered in the system, when an error has occurred during the translation process, or when the processing result has a low certainty factor, a text output of a defined sentence and an output of the recorded input character image are displayed in combination, thus reducing the number of times of user's manual correction upon occurrence of a recognition error or any other errors, and improving the convenience.

Other Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which contains a program code of a software program that can implement the functions of the above-mentioned embodiments to the system or apparatus. The program code is then read and executed by a computer (or a CPU or MPU) of the system or apparatus.

In this case, the program code, itself, read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented either by executing the readout program code with the computer or by executing instructions of the program code like some or all of actual processing operations executed by an OS (operating system) running on the computer.

Furthermore, the functions of the above-mentioned embodiments may be implemented by some or all of actual processing operations executed by a CPU or the like arranged in a function extension board or a function extension unit, which is inserted in or connected to the computer. Once the program code is read out from the storage medium, it is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-378877 filed on Nov. 7, 2003 which is hereby incorporated herein by reference herein.

The invention claimed is:

1. An information processing apparatus for processing (1) a sentence having a defined portion and a missing portion, and (2) input speech data corresponding to the missing portion, the apparatus comprising:
 (a) registration means for registering a defined portion translation, which is a translation of the defined portion;
 (b) recording means for recording the input speech data corresponding to the missing portion;
 (c) generation means for, when the speech data is input, simultaneously generating:
  (i) defined portion translation speech data, which is speech data to output speech corresponding to the defined portion translation registered in said registration means, and
  (ii) missing portion translation speech data, which is speech data to output speech corresponding to a missing portion translation, the missing portion translation being a recognized and translated result of the input speech data;

(d) first determination means for determining whether all of the input speech data has been recognized;

(e) second determination means for, if said first determination means determines that all of the input speech data has been recognized, determining whether all of a recognition result has been translated, the recognition result being obtained by speech-recognizing the input speech data; and (f) speech output means for outputting speech under the following conditions:
   (i) if said first determination means determines that all of the input speech data has not been recognized or said second determination means determines that all of the recognition result has not been translated, said speech output means outputs speech by combining the speech data recorded by said recording means with the defined portion translation speech data,
   (ii) otherwise, said speech output means outputs speech by combining the defined portion translation speech data with the missing portion translation speech data.

2. The apparatus according to claim 1, wherein said first determination means determines that all of the input speech data has not been recognized when a phrase corresponding to the input speech data is not registered in a syntax for speech recognition or when an error occurs during a speech recognition process.

3. The apparatus according to claim 1, wherein if said first determination means determines that all of the input speech data has not been recognized, said speech output means outputs information representing that all of the input speech data was not recognized.

4. The apparatus according to claim 1, wherein if said second determination means determines that all of the recognition result has not been translated, said speech output means outputs information representing that all of the recognition result was not translated.

5. An information processing apparatus for processing (1) a sentence having a defined portion and a missing portion, and (2) input speech data corresponding to the missing portion, the apparatus comprising:

(a) registration means for registering a defined portion translation, which is a translation of the defined portion;

(b) recording means for recording the input speech data corresponding to the missing portion;

(c) generation means for, when the speech data is input, simultaneously generating:
   (i) defined portion translation speech data, which is speech data to output speech corresponding to the defined portion translation registered in said registration means, and
   (ii) missing portion translation speech data, which is speech data to output speech corresponding to a missing portion translation, the missing portion translation being a recognized and translated result of the input speech data;

(d) acquisition means for acquiring a recognition certainty factor of a recognition result, the recognition result being obtained by speech-recognizing the input speech data;

(e) determination means for, if the recognition certainty factor is more than a predetermined threshold value, determining whether all of the recognition result has been translated; and (f) speech output means for outputting speech under the following conditions:
   (i) if the recognition certainty factor is less than the predetermined threshold value or said determination means determines that all of the recognition result has not been translated, said speech output means outputs speech by combining the speech data recorded by said recording means with the defined portion translation speech data,
   (ii) otherwise, said speech output means outputs speech by combining the defined portion translation speech data with the missing portion translation speech data.

6. The apparatus according to claim 5, wherein if the recognition certainty factor is less than the predetermined threshold value, said speech output means outputs information representing that the recognition certainty factor of the recognition result is low.

7. An information processing apparatus for processing (1) a sentence having a defined portion and a missing portion, and (2) input speech data corresponding to the missing portion, the apparatus comprising:

(a) registration means for registering a defined portion translation, which is a translation of the defined portion;

(b) recording means for recording the input speech data corresponding to the missing portion;

(c) generation means for, when the speech data is input, simultaneously generating:
   (i) defined portion translation speech data, which is speech data to output speech corresponding to the defined portion translation registered in said registration means, and
   (ii) missing portion translation speech data, which is speech data to output speech corresponding to a missing portion translation, the missing portion translation being a recognized and translated result of the input speech data;

(d) determination means for determining whether all of the input speech data has been recognized;

(e) acquisition means for, if said determination means determines that all of the input speech data has been recognized, acquiring a translation certainty factor of the missing portion translation; and (f) speech output means for outputting speech under the following conditions:
   (i) if said determination means determines that all of the input speech data has not been recognized or the translation certainty factor is less than a predetermined threshold value, said speech output means outputs speech by combining the speech data recorded by said recording means with the defined portion translation speech data,
   (ii) otherwise, said speech output means outputs speech by combining the defined portion translation speech data with the missing portion translation speech data.

8. The apparatus according to claim 7, wherein if the translation certainty factor is less than the predetermined threshold value, said speech output means outputs information representing that the translation certainty factor of the translation result of the missing portion translation is low.

9. An information processing apparatus for processing (1) a sentence having a defined portion and a missing portion, and (2) input speech data corresponding to the missing portion, the apparatus comprising:

(a) registration means for registering a defined portion translation, which is a translation of the defined portion;

(b) recording means for recording the input speech data corresponding to the missing portion;

(c) generation means for, when the speech data is input, simultaneously generating:
  (i) defined portion translation speech data, which is speech data to output speech corresponding to the defined portion translation registered in said registration means, and
  (ii) missing portion translation speech data, which is speech data to output speech corresponding to a missing portion translation, the missing portion translation being a recognized and translated result of the input speech data;
(d) first acquisition means for acquiring a recognition certainty factor of a recognition result, the recognition result being obtained by speech-recognizing the input speech data;
(e) second acquisition means for, if the recognition certainty factor is more than a first predetermined threshold value, acquiring a translation certainty factor of the missing portion translation; and
(f) speech output means for outputting speech under the following conditions:
  (i) if the recognition certainty factor is less than the first predetermined threshold value or the translation certainty factor is less than a second predetermined threshold value, said speech output means outputs speech by combining the speech data recorded by said recording means with the defined portion translation speech data,
  (ii) otherwise, said speech output means outputs speech by combining the defined portion translation speech data with the missing portion translation speech data.

10. An information processing method for processing (1) a sentence having a defined portion and a missing portion, and (2) input speech data corresponding to the missing portion, the method comprising:
  (a) a registration step of registering a defined portion translation, which is a translation of the defined portion;
  (b) a recording step of recording the input speech data corresponding to the missing portion;
  (c) a generation step of, when the speech data is input, simultaneously generating:
    (i) defined portion translation speech data, which is speech data to output speech corresponding to the defined portion translation registered in said registration step, and
    (ii) missing portion translation speech data, which is speech data to output speech corresponding to a missing portion translation, the missing portion translation being a recognized and translated result of the input speech data;
  (d) a first determination step of determining whether all of the input speech data has been recognized;
  (e) a second determination step of, if it is determined in said first determination step that all of the input speech data has been recognized, determining whether all of a recognition result has been translated, the recognition result being obtained by speech-recognizing the input speech data; and
  (f) a speech output step of outputting speech under the following conditions:
    (i) if it is determined in said first determination step that all of the input speech data has not been recognized or if it is determined in said second determination step that all of the recognition result has not been translated, speech is output by combining the speech data recorded in said recording step with the defined portion translation speech data,
    (ii) otherwise, speech is output by combining the defined portion translation speech data with the missing portion translation speech data.

11. A computer-readable medium having computer-executable instructions for causing a computer to perform the method recited in claim 10.

12. The method according to claim 10, wherein in the first determination step it is determined that all of the input speech data has not been recognized when a phrase corresponding to the whole input speech data is not registered in a syntax for speech recognition or when an error occurs during a speech recognition process.

13. A computer-readable medium having computer-executable instructions for causing a computer to perform the method recited in claim 12.

14. An information processing method for processing (1) a sentence having a defined portion and a missing portion, and (2) input speech data corresponding to the missing portion, the method comprising:
  (a) a registration step of registering a defined portion translation, which is a translation of the defined portion;
  (b) a recording step of recording the input speech data corresponding to the missing portion;
  (c) a generation step of, when the speech data is input, simultaneously generating:
    (i) defined portion translation speech data, which is speech data to output speech corresponding to the defined portion translation registered in said registration step, and
    (ii) missing portion translation speech data, which is speech data to output speech corresponding to a missing portion translation, the missing portion translation being a recognized and translated result of the input speech data;
  (d) an acquisition step of acquiring a recognition certainty factor of a recognition result, the recognition result being obtained by speech-recognizing the input speech data;
  (e) a determination step of, if the recognition certainty factor is more than a predetermined threshold value, determining whether all of the recognition result has been translated; and
  (f) a speech output step of outputting speech under the following conditions:
    (i) if the recognition certainty factor is less than the predetermined threshold value or if it is determined in said determination step that all of the recognition result has not been translated, speech is output by combining the speech data recorded in said recording step with the defined portion translation speech data,
    (ii) otherwise, speech is output by combining the defined portion translation speech data with the missing portion translation speech data.

15. A computer-readable medium having computer-executable instructions for causing a computer to perform the method recited in claim 14.

16. An information processing method for processing (1) a sentence having a defined portion and a missing portion, and (2) input speech data corresponding to the missing portion, the method comprising:
  (a) a registration step of registering a defined portion translation, which is a translation of the defined portion;
  (b) a recording step of recording the input speech data corresponding to the missing portion;
  (c) a generation step of, when the speech data is input, simultaneously generating:

(i) defined portion translation speech data, which is speech data to output speech corresponding to the defined portion translation registered in said registration step, and (ii) missing portion translation speech data, which is speech data to output speech corresponding to a missing portion translation, the missing portion translation being a recognized and translated result of the input speech data;

(d) a determination step of determining whether all of the input speech data has been recognized;

(e) an acquisition step of, if it is determined in said determination step that all of the input speech data has been recognized, acquiring a translation certainty factor of the missing portion translation; and (f) a speech output step of outputting speech under the following conditions:

(i) if it is determined in said determination step that all of the input speech data has not been recognized or the translation certainty factor is less than a predetermined threshold value, speech is output by combining the speech data recorded in said recording step with the defined portion translation speech data, (ii) otherwise, speech is output by combining the defined portion translation speech data with the missing portion translation speech data.

17. A computer-readable medium having computer-executable instructions for causing a computer to perform the method recited in claim 16.

18. An information processing method for processing (1) a sentence having a defined portion and a missing portion, and (2) input speech data corresponding to the missing portion, the method comprising:

(a) a registration step of registering a defined portion translation, which is a translation of the defined portion;

(b) a recording step of recording the input speech data corresponding to the missing portion;

(c) a generation step of, when the speech data is input, simultaneously generating:

(i) defined portion translation speech data, which is speech data to output speech corresponding to the defined portion translation registered in said registration step, and (ii) missing portion translation speech data, which is speech data to output speech corresponding to a missing portion translation, the missing portion translation being a recognized and translated result of the input speech data;

(d) a first acquisition step of acquiring a recognition certainty factor of a recognition result, the recognition result being obtained by speech-recognizing the input speech data;

(e) a second acquisition step of, if the recognition certainty factor is more than a first predetermined threshold value, acquiring a translation certainty factor of the missing portion translation; and (f) a speech output step of outputting speech under the following conditions:

(i) if the recognition certainty factor is less than the first predetermined threshold value or the translation certainty factor is less than a second predetermined threshold value, speech is output by combining the speech data recorded in said recording step with the defined portion translation speech data, (ii) otherwise, speech is output by combining the defined portion translation speech data with the missing portion translation speech data.

19. A computer-readable medium having computer-executable instructions for causing a computer to perform the method recited in claim 18.

* * * * *

UNITED STATES PATENT AND TRADEMARK OFFICE
CERTIFICATE OF CORRECTION

PATENT NO.        : 7,421,394 B2                                    Page 1 of 1
APPLICATION NO.   : 10/577493
DATED             : September 2, 2008
INVENTOR(S)       : Omi et al.

It is certified that error appears in the above-identified patent and that said Letters Patent is hereby corrected as shown below:

ON THE TITLE PAGE
At (56) References Cited, U.S. PATENT DOCUMENTS:

"2003/0061030 A1   3/2003 Kuboyama e al."
        should read --2003/0061030 A1   3/2003   Kuboyama et al.--.

COLUMN 6:

Line 61, " "へはどう行け?" " should read -- "へはどう行けばいいですか?" --.

COLUMN 7:

Line 2, " "へはどう行け?" " should read -- "へはどう行けばいいですか?" --.

Line 14, " "へはどう行け?" " should read -- "へはどう行けばいいですか?" --.

Signed and Sealed this

Seventeenth Day of February, 2009

JOHN DOLL
*Acting Director of the United States Patent and Trademark Office*